United States Patent [19]

Carrigan, Jr.

[11] Patent Number: 5,002,304
[45] Date of Patent: Mar. 26, 1991

[54] COLLAPSIBLE CART
[75] Inventor: Richard M. Carrigan, Jr., Evanston, Ill.
[73] Assignee: Travel Caddy Inc., Chicago, Ill.
[21] Appl. No.: 352,567
[22] Filed: May 16, 1989
[51] Int. Cl.$^5$ ............................................. B62B 1/04
[52] U.S. Cl. ................................. 280/655; 280/47.29; 280/47.315
[58] Field of Search ................. 280/655, 654, 47.29, 280/655.1, 47.315, 47.371, 643, 47.28; 403/109, 110, 104, 374

[56] References Cited

U.S. PATENT DOCUMENTS

| | | | |
|---|---|---|---|
| 2,795,433 | 6/1957 | Moriarity | 280/47.28 |
| 4,175,769 | 11/1979 | Kazmark | 280/654 |
| 4,275,894 | 6/1981 | Mortenson | 280/47.29 |
| 4,286,969 | 9/1981 | Esposito | 280/655 |
| 4,523,773 | 6/1985 | Holtz | 280/655 |
| 4,546,995 | 10/1985 | Kassai | 280/655 |
| 4,784,405 | 11/1988 | Stein | 280/655 |

FOREIGN PATENT DOCUMENTS 2040236  8/1980  United Kingdom ................ 280/655

Primary Examiner—David M. Mitchell
Attorney, Agent, or Firm—Fitch, Even, Tabin & Flannery

[57] ABSTRACT

A collapsible cart has pivotally interconnected backing and platform body members. A handle extends from the backing member and a clamp or other lock is provided to release the handle for movement to a variety of extended positions. The platform member is pivotally moveable toward and away from the backing member. The backing member and platform member include interlocking components to maintain the platform member in a fully extended or opened position, thus preventing its collapse against the backing member. The cart also includes a stop member to prevent the platform from opening beyond a desired position, particularly when placed under load.

2 Claims, 2 Drawing Sheets

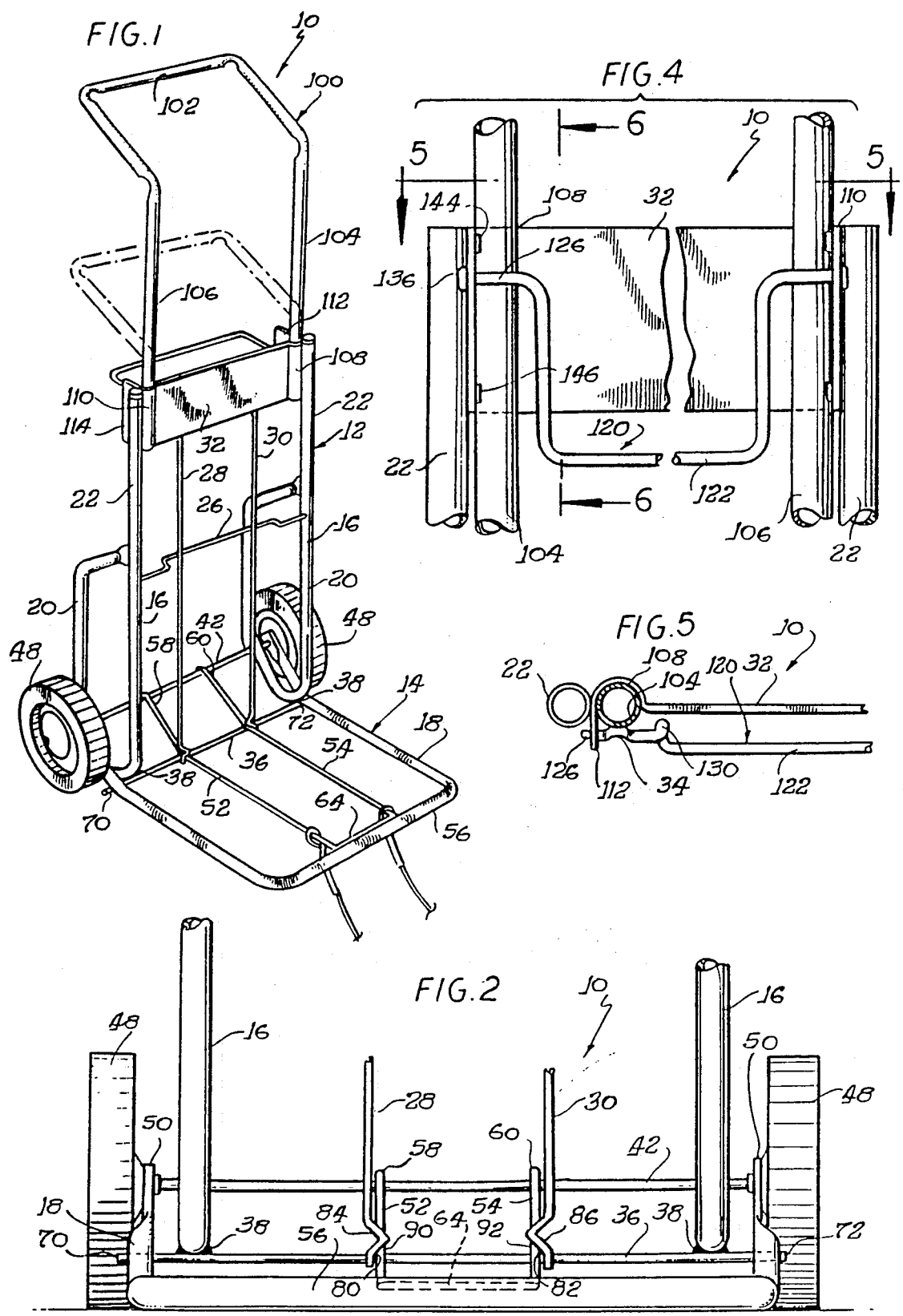

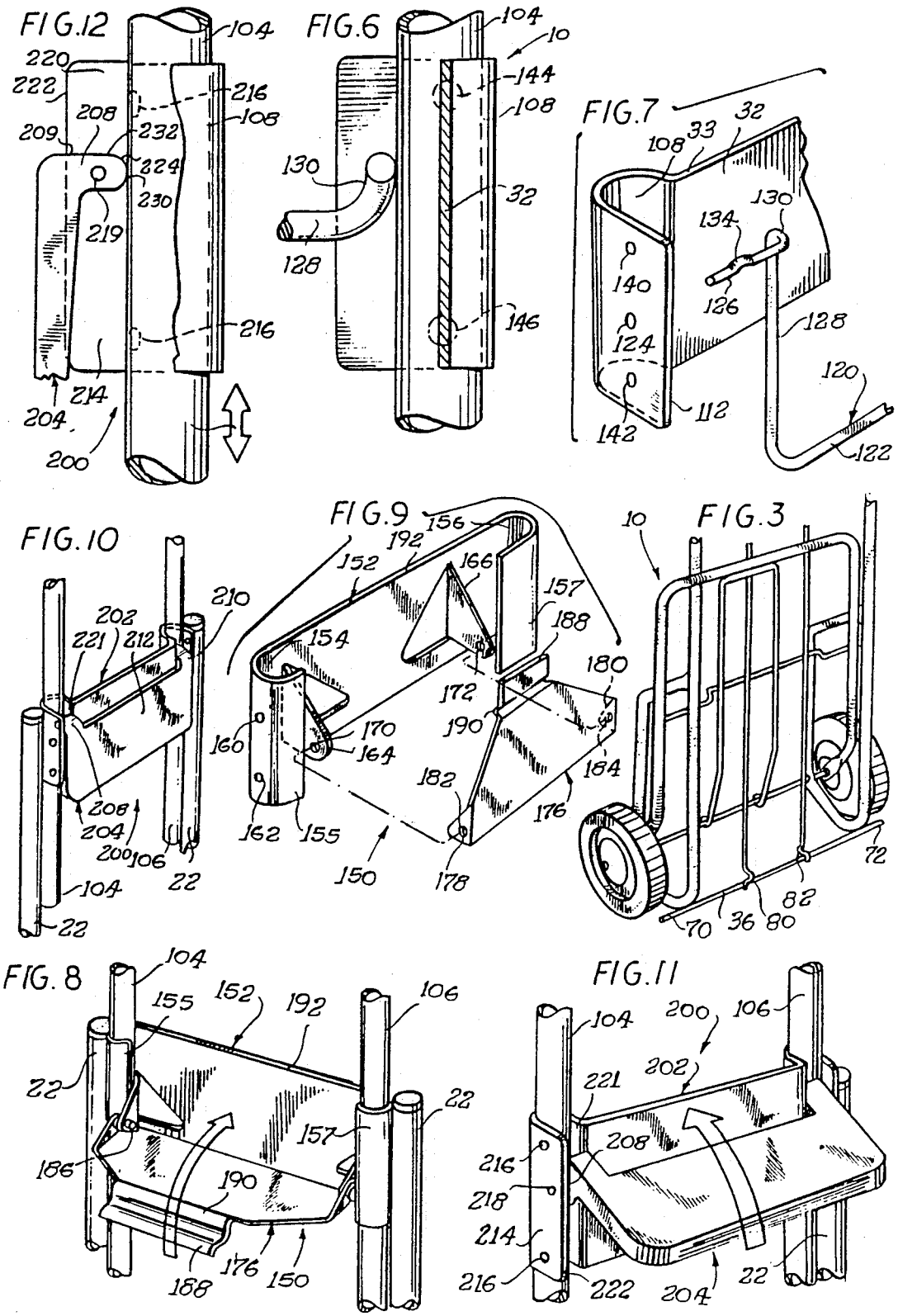

COLLAPSIBLE CART

BACKGROUND OF THE INVENTION

The present invention pertains to carts of the type used for carrying luggage and other personal articles.

DESCRIPTION OF THE RELATED ART

Many air travel and other passengers find it convenient today to limit their belongings to luggage which can be carried by hand. At times, however, it is cumbersome to carry the luggage over long distances. There are a number of carts in use today which are collapsible, so as to be storable in an aircraft or other vehicle during transit between departure and destination locations. Further, it has become popular to make such luggage carts out of relatively light weight materials, since the carts must be picked up and stowed away by a user.

As mentioned above, carts have been provided which are collapsible for compact storage. Such carts may include, for example, an upright body member and a horizontal body member on which luggage may be loaded. The horizontal and vertical body members are relatively large and generally planar. Accordingly, it is convenient to pivotally mount the vertical and horizontal body members to one another so that they can be collapsed with one lying adjacent the other. For example, the horizontal body member may be pivoted to rest against the vertical body member.

In the past, in order to simplify the cart design and to save added expense, the horizontal body member has normally been locked in position by the weight of the luggage or other items piled thereon. While generally satisfactory in a controlled environment, carts having this type of construction are somewhat unstable, especially when the items transported on the cart are secured by an elastic stretch cord which is customarily fastened to the horizontal body member, drawn over the object to be transported, and then secured to the vertical body member. The pulling action of the stretch cord has a tendency to collapse the vertical and horizontal members towards each other, applying pressure on the objects to be transported which lie between the vertical and horizontal members, causing possible damage to the objects. It is therefore desirable to provide a locking arrangement to maintain a fixed angular displacement between the vertical and horizontal body members. Such locking arrangements should not, however, add significantly to the cost or weight of the luggage cart.

Additionally, improvements to luggage carts may include an adjustable handle to accommodate users of different height. In addition, luggage carts of the type referred to herein frequently are provided with a wheeled axle supporting the vertical and horizontal body members above the ground. At times, it is desirable to maintain a near vertical orientation because of the type of packages being carried or for other reasons. In situations of this type, a long handle, located well above a user's waist, would be inconvenient. However, at other times, it is convenient to have a relatively long handle to eliminate short, choppy undulations of the cart while walking at a brisk pace.

SUMMARY OF THE INVENTION

It is an object of the present invention to provide a collapsible cart which is small and lightweight, and is suitable for carrying luggage and for other tasks.

Another object of the present invention is to provide a collapsible luggage cart having an adjustably extendable handle which is easy to adjust.

A further object of the present invention is to provide a luggage cart having generally vertical and horizontal body members angularly displaced from one another which are locked in that angular displacement so as to prevent a collapse thereof.

These and other objects, according to the present invention, which will become apparent from studying the appended description and drawings, are provided in a collapsible cart comprising:

first and second body members pivotally connected together at first ends;

wheel means for supporting the first ends of the body member above a ground surface;

handle means mounted to said first body member for telescopic sliding therewith so as to extend varying amounts therefrom;

locking means on said first body member for selective clamping engagement with said handle means at a first extension position; and said locking means being selectively releasable so as to release said handle means for movement to a second extension position and to reengage said handle means with said handle means at said second position.

BRIEF DESCRIPTION OF THE DRAWINGS

In the drawings, wherein like elements are referenced alike,

FIG. 1 is a perspective view of a first embodiment of a collapsible cart illustrating aspects according to the present invention;

FIG. 2 is a fragmentary front elevational view showing the lower portion of the cart of FIG. 1;

FIG. 3 is a fragmentary perspective view showing the cart of the preceding figures in a collapsed position;

FIG. 4 is a fragmentary rear elevational view of the cart of the preceding figures showing the handle locking portion thereof;

FIG. 5 is a fragmentary cross-sectional view taken along the line 5—5 of FIG. 4, showing the handle thereof in a locked position;

FIG. 6 is a fragmentary side elevational view of the cart in a locked handle position, taken along the line 6—6 of FIG. 4;

FIG. 7 is a fragmentary exploded view showing the handle locking means in greater detail;

FIG. 8 is a fragmentary perspective view of another embodiment of a cart having a handle lock;

FIG. 9 is an exploded perspective view of the handle locking means of the cart of FIG. 8;

FIG. 10 is a fragmentary perspective view showing a further alternative embodiment of a cart having a handle locking means;

FIG. 11 is a fragmentary perspective view showing the handle locking means of FIG. 10 in greater detail; and FIG. 12 is a fragmentary perspective view of the cart of FIGS. 10 and 11.

DETAILED DESCRIPTION OF THE PREFERRED EMBODIMENTS

Referring now to the drawings, and initially to FIGS. 1-7, a collapsible cart is generally indicated at 10. As will be seen herein, cart 10 is of a light weight yet strong construction and is configurable between expanded and collapsed positions. In the expanded position, shown in FIG. 1, the cart can be used to carry suitcases, electronic equipment such as computers and the like, and other similar articles from place to place. Cart 10 includes first and second body members, herein backing and platform members 12, 14, each comprising an open, grid-like frame. The body members 12, 14 are preferably constructed of generally U-shaped tubular frame members 16, 18 having a plurality of steel or aluminum wires joined thereto by any suitable means such as welding or brazing.

The backing member 12 has a pair of generally vertical tubular frame members 16, each of which has a D-shaped configuration including a lower generally trapezoidal frame portion 20 and an upper extension portion 22. The backing member 12 further includes wirelike frame members having a horizontal member 26 and a pair of generally vertical or longitudinally extending frame members 28, 30. The tubular extension portions 22 and the vertical wire frame members 28, 30 are terminated at an upper cross bar 32 which is formed from flat, sheet-like stock.

The backing member 12 further includes a horizontal wirelock lower cross bar 36. The cross bar 36 is welded at 38 to the lower ends of the trapezoidal frame portions 20 and serves to hold the lower ends of the frame members 16 at a fixed distance. The upper ends of the frame members 16 are spaced at a fixed distance through rigid securement to the upper cross bar 32. The vertical wire members 28, 30 have first ends affixed to the upper cross bar 32 and second, opposed ends affixed to the lower cross bar 36, being secured thereto by any suitable means, preferably by welding.

An axle 42 spans the vertical frame members 16 and is secured thereto at the lower rearward ends thereof. The axle preferably provides further support in maintaining the frame members at a desired fixed distance. A pair of wheels 48 are mounted at the ends of axle 42 and provide a rolling support for the cart.

The platform member 14, which serves as a platform upon which luggage and the like are carried, includes the aforementioned generally U-shaped tubular frame member 18. The rearward end portions of the frame member 18 are upwardly inclined to correspond to the upward and rearward extending offset of the lower frame portion 20. The rearward free ends 50 of the tubular frame 18 are pivotally mounted to the ends of shaft 42. Pivoting of frame 18 about shaft 42 varies the angular displacement between the backing and platform members 12, 14. As will be seen with reference to FIG. 3, the body members 12, 14 can be collapsed or brought into contact with one another.

With continued reference to FIG. 1, the platform member 14 includes internal wirelike frame members 52, 54 which have first free ends joined to the bight portion 56 of tubular frame 18 and second, generally opposed, upward inclined free ends 58, 60 which are rotatably and slidably mounted on shaft 42 so as to be free to rotate thereabout and slide therealong as frame 18 is rotated about the shaft. In the preferred embodiment, wirelike frame members 52, 54 preferably comprise legs of a unitary U-shaped wire member having a bight portion 64 which is welded or otherwise secured to the bight portion 56 of tubular frame 18.

The wirelike frame members 52, 54 are located internal of an outer, surrounding frame 18 and are flexible so as to be deflectable toward and away from one another upon the application of manual squeezing pressure applied thereto.

As those skilled in the art will readily appreciate, the platform member 14, when loaded with luggage will tend to "open" or rotate further away from the generally upright backing member 12, than is normally desired. Accordingly, with certain aspects of the present invention, a stop is provided to restrict the angular displacement of the backing and platform members 12, 14. The preferred stop member according to the present invention comprises extensions 70, 72 at opposed ends of the lower cross bar 36. The cross bar is positioned such that the extensions 70, 72 thereof interfere with portions of tubular frame 18, adjacent the free ends thereof by contacting the tubular member when the cart is expanded to its fully opened position, at the point of maximum angular separation from the backing member 12. As can be seen with reference to FIG. 2, the welded securement 38 of the cross bar to the upright tubular frame members 16 is closely spaced to the point of contact of tubular member 18 to the lower cross bar 36.

As can be seen from the above, the present invention provides a stop to prevent opening of the cart beyond a preselected range. Further, as will be appreciated by those experienced in the art, it is desirable to restrict the collapse of a cart as when the platform and backing members are moved toward each other. The need for this restraint is especially important where fragile items loaded on the cart might become damaged, should the bottom of the platform member 14 inadvertently contact another object such as a street curb or a building wall, for example.

However, the backing and platform members 12, 14 of the cart should, on demand, be easily releasable for movement toward one another to facilitate a collapse or closing of the cart for storage. According to other aspects of the present invention, a releasable platform locking means is provided, whereby the backing and platform members 12, 14 are held apart at a preselected angular position, with collapse of the cart being prevented. The locking means is selectably releasable so as to allow the backing and platform members 12, 14 to be drawn toward one another on demand.

In some of its aspects, the platform locking means according to the present invention is provided by opposed, inwardly extending recesses 80, 82 formed adjacent the lower cross bar 36. The recesses are preferably formed by inwardly extending dimple portions 84, 86 formed in the vertical wire members 28, 30 of the backing member 12. The dimpled portions 84, 86 extend toward one another, and are spaced a small distance above the lower cross bar 36 so as to form the recesses 80, 82 therewith. It is generally preferred that the recesses 80, 82 be formed with the lower cross bar 36. Contact between the rodlike internal members 52, 54 with the lower cross bar 36 will further assist in limiting the opening of the angular displacement of the backing and platform members, although such is not a primary feature of the internal members 52, 54, and may be omitted if desired.

It is generally preferred that the internal members 52, 54 be inwardly deflectable toward one another upon the application of manual pressure thereto. In the preferred embodiment, wire-like frame members 52, 54 have a relatively small cross-sectional dimension compared to the frame members 16, 18 or the axle 42 and the spacing between internal members 52, 54 is considerably smaller than their axial length. Accordingly, a user can develop a significant mechanical advantage in compressing the wirelike members 52, 54 toward one another without significant effort.

According to another feature of the present invention, the wirelike members 52, 54 are easily deflectable so as to slide past the dimple portions 84, 86, camming thereagainst to produce an inward displacement of the frame members during opening of the cart backing and platform members, quickly followed by an outward expansion of the frame members within recesses 80, 82. It is generally preferred that the recesses 80, 82 be dimensioned for a close tolerance fit with the members 52, 54 so as to eliminate any significant amount of play of the internal members within the recesses. This relatively snug fit maintains the members 52, 54 captivated in the recesses by the dimples 84, 86 despite generally upwardly directed forces applied to the platform member which would move that body member in a closing position toward the generally upright, backing member 12.

Whereas the extensions 70, 72 limit opening movement of the platform member 14, the dimples 84, 86 and recesses 80, 82 prevent a closing movement of the platform member 14. Thus, a cart constructed according to principles of the present invention can withstand a significant loading of luggage, equipment and the like to be carried by the cart. Further, unintentional collapse of the cart is prevented in the aforementioned manner, thus avoiding injury to the luggage or equipment being carried, should the platform member 14 inadvertently contact another object such as a curb or a wall. As can be seen from the above, the releasable, two-directional locking of the platform member 14 is accomplished with a minimum number of relatively inexpensive parts.

As will now become apparent to those skilled in the art, several modifications may be made without departing from the principles of the present invention. For example, the dimples 84, 86 could be replaced with a separate member which is welded or otherwise affixed to lower cross bar 36 and which has portions spaced therefrom so as to form therewith recesses for receiving the internal wirelike members 52, 54 and to provide surfaces interfering with the frame members so as to prevent their upward travel.

Referring again to FIG. 1, cart 10 includes an adjustable handle 100 which is telescopically movable toward and away from the backing member 12. The handle 100, which is constructed according to principles of the present invention, provides an adjustment for users of differing heights, thus allowing different users to maintain the same general angle of inclination of the cart when pulling or pushing the cart from one location to another. The handle 100 includes a bight portion 102 intermediate a pair of end portions 104, 106. The free ends of the end portions 104, 106 preferably comprise right circular cylinders which may be made from conventional tubing materials. The end portions 104, 106 are slidably receivable in channels 108, 110 formed at the lateral ends of the upper cross bar 32.

With reference to FIGS. 5 and 7, the channels include a part cylindrical channel portion blended into a rearwardly extending sidewall of the upper cross bar. The sidewall of channel 108 is denoted by the reference numeral 112 and the sidewall for channel 110 is denoted by the reference numeral 114. As will now be seen, the sidewalls conveniently provide mounting for a variety of different handle locking structures. The channels 108, 110 have a generally smooth inner wall surface for sliding against the outer surface of handle ends 104, 106. Thus, the handle ends are freely slidable within the channels of the upper cross bar 32 and would readily become disengaged from the backing member 12 were a locking not provided.

Turning again to FIGS. 1-7, and with particular reference to FIGS. 4-7, a locking means for the handle ends is generally indicated at 120. As will be seen herein, many of the features of the locking means are conveniently formed in a single wirelike or rodlike element. The locking means 120 of the preferred embodiment includes a manually graspable lock actuator 122 which is swung or rotated about an axis which extends through mounting aperture 124 formed in sidewall 112. The lock actuator 122 further includes an end portion 126 having a free end insertable through the mounting aperture 124 to cooperate therewith for a pivotal mounting of lock actuator 122. The lock actuator includes a leg portion 128 and a lateral offset portion 130 intermediate the leg and free end 126. Immediately adjacent the free end of the lock actuator is a protrusion or camming member 134 which, with reference to the fully locked position illustrated in FIG. 5, extends forwardly in the same direction as the lateral offset 130. In the preferred embodiment, the end portion 126 of the lock actuator extends generally parallel to the upper cross bar 32, that is, in a direction generally perpendicular to the handle end portions 104, 106. The otherwise straight-line end portion is disrupted by the outwardly protruding cam 134 which extends away from the end portion toward the handle end 104.

In the fully locked position of FIG. 5, the camming member 134 is pushed against the outer surface of handle end 104 and exerts a significant pressure thereagainst, creating a frictional engagement throughout the channel 108 to create a significant frictional engagement between the handle end and the upper cross bar 32. If desired, the tip 136 of end section 126 can be enlarged in the manner illustrated in FIG. 4, to prevent an unintentional withdrawal of the handle through aperture 124, causing disengagement thereof from sidewall 112.

With reference to FIG. 7, the sidewall 112 includes dimples or protrusions 140, 142 for captive engagement of the handle therein, despite forces applied to the handle when placed under load. The protrusions engage the handle ends to prevent their swinging or pivoting out of the channel 108. To further aid in retaining the handle ends within the channels, the locking means 120 is spaced a preselected distance below the top surface 33 of upper cross bar 32.

With reference to FIGS. 1 and 6, the handle 122 is swingable to a generally horizontal position whereat the camming member 134 is brought out of compressive engagement with handle end 104, thereby reducing the frictional engagement of the handle end with channel 108 so as to allow the handle end to be freely movable within the channel. FIG. 1 illustrates the adjustment of the handle 100 between an extended position shown in solid lines, and a retracted position shown in phantom lines. Assuming the cart is returned from service with the handle in a retracted or lowered position, lower than that desired, a user merely grasps the lock actuator 122 and raises the lock actuator to the position illustrated in FIGS. 1 or 6. By raising the lock actuator, the camming member of the locking means is brought out of compressive engagement with the handle ends, which can now be raised by the user to a desired position. When the proper amount of extension is observed, the handle position is securely maintained by lowering the lock actuator so that the intermediate leg portions 128 thereof are aligned parallel to the axis of the handle ends and the frame members of the backing member. It should be noted that the lock actuator 122 is conveniently stored in the backing member when placed in a fully locked position. In the preferred embodiment, the actuator of the locking means is bent in the manner described above to provide the desired offset and camming members, but in general has a relatively narrow profile. Thus, the lock actuator can be easily stored in the cavity formed between the upright extensions 22 of the frame members 16. In order to provide a more compact handle storage, the offset 130 can be omitted, but the offset has been found convenient to provide an additional mechanical advantage in applying a locking and unlocking force to the camming member 134 and also to provide an added rigidity and strength to the lock actuator, a feature particularly desirable when the lock actuator is made of inexpensive bar or wire stock.

Referring now to FIGS. 8 and 9, an alternative locking means 150 according to other aspects of the present invention will now be described. As was seen above, the locking means 120 provided a light weight economical construction which is formed by bending a wire or rodlike element. In the alternative embodiment of FIGS. 8 and 9, the locking means 150 is incorporated into a tray-like actuator, which some users find convenient for temporarily placing relatively small articles such as coffee cups or the like. The alternative lock construction 150 includes a modified upper cross bar, herein identified by the reference numeral 152. As in the preceding embodiment of FIGS. 1-7, the upper cross bar 152 includes channels 154, 156 at its end portions for receiving the handle ends 104, 106 in a sliding manner as described above. As can be seen in FIG. 9, the end portions include dimples or protrusions 160, 162 which maintain the handle ends captive within the channels 154, 156 when bending stresses are applied to the handle, as when the cart is placed in use. If desired, however, the protrusions can be eliminated, since the cross bar of this embodiment includes rear wall portions 155, 157 which can be located for close spacing from handle ends received in the channels. The rear wall portions can thus engage the handle ends to prevent their rearward swinging or pivoting when rearward directed bending forces are applied to the handle.

The upper cross bar 152 includes mounting ears 164, 166 which are preferably struck out from the main body portion of the upper cross bar, but which may comprise separate members welded or otherwise secured to the cross bar. In the preferred embodiment, the mounting ears 164, 166 preferably have a generally triangular configuration with rearwardly extending corner portions. Apertures 170, 172 are formed in the corner portions to provide a convenient hingeable or swingable mounting for a tray-like actuator member 176.

The actuator 176, which is preferably formed of stamped metal, has generally triangular shaped mounting ears 178, 180 also with apertures 182, 184. The actuator 176 is configured so that the apertures 182, 184 thereof are aligned in registry with the apertures 170, 172 of the cross bar mounting ears in the manner illustrated in the exploded view of FIG. 9. Rivet-like fasteners 186 (see FIG. 8) provide a hinged connection between the actuator and cross bar so as to permit pivoting or swivelling between the open position of FIG. 8 and a closed position (suggested by FIG. 9) where the actuator is raised into contact with the cross bar 152.

The actuator includes a manually graspable actuator portion 188 at its free edge. A forwardly protruding channel 190 provides a camming engagement with the upper edge 192 of cross bar 152 to provide a snap lock engagement therewith. When the protruding channel 190 of actuator 176 and the upper edge 192 of cross bar 152 are snapped together, the locking means 150 is in a fully closed or engaged position in which the handle ends 104, 106 are prevented from axial displacement relative to the channels 154, 156.

As illustrated in FIG. 8, the mounting ears 164, 166 struck out from cross bar 152 cooperate with the channels 154, 156 to form an enclosed passageway for the handle ends, with the mounting ears 164, 166 located immediately adjacent the inner surfaces of the handle ends of a fully assembled cart. With the actuator 176 raised to the aforementioned fully closed position, the mounting ears 178, 180 thereof are interposed between the cross bar mounting ears 170, 172 and the handle ends 104, 106 to provide a wedged engagement therebetween. In the preferred embodiment, the channels 154, 156 enclose approximately one half the outer surface of the handle ends received therein, which represents a surface area of significant size. Frictional pressure between that surface area of the handle ends and the internal surfaces of the cross bar channels 154, 156 develops significant friction forces when the mounting ears 178, 180 of the lock actuator are raised into the wedged position to press the handle ends against the internal walls of the cross bar channels.

As mentioned above, the preferred configuration of mounting ears 178, 180 is generally triangular, and, as can be seen in FIG. 8, a significant portion of the mounting ears is brought into contact with the handle ends when the locking means 150 is raised so as to be fully closed. Accordingly, significant frictional forces between the mounting channels and handle ends are easily developed when actuator 176 is snapped into a closed position. If desired, the mounting ears 178, 180 of the actuator can be formed with convex outer surfaces which, when cammed against the handle ends 104, 106 produce an increased frictional force. With the actuator lifted in a fully closed position, the actuator is stored between the upper sections 22 of the frame members and accordingly the actuator does not present an obstruction to a user of the cart. Those skilled in the art will readily appreciate that the locking means 150 can be economically formed from a minimum number of inexpensive parts, using relatively inexpensive machining operations. In the preferred embodiment, the actuator 176 of locking means 150 and the cross bar 152 are preferably formed from stamped metal, although other materials can also be used.

Referring now to FIGS. 10-12, a further embodiment of the locking means will now be described. The alternative locking means generally indicated at 200 includes an upper cross bar 202 which is virtually identical to the aforementioned upper cross bar 32 of FIGS. 1-7, except for the handle-receiving channels. The locking means 200 further includes a tray-like actuator member 204 preferably formed of molded plastic and having a central body portion 206 and a pair of opposed mounting ears 208, 210.

FIGS. 10 and 12 show the locking means in a fully engaged position, with the major body portion 212 of the actuator in a generally vertical or stored position, lying between the vertical extension portions 22 of the backing member 12. The mounting ear 208 illustrated in FIG. 12 has dimples or protrusions 216 for maintaining engagement of the handle ends within the channels of the cross bar. Referring to FIG. 11, the left-hand vertical extension portions 22 of the backing member 12 has been omitted for purposes of clarity. Accordingly, the sidewall 214 of the upper cross bar 202 and the protrusions 216 formed therein are visible.

The channels of the upper cross bar 202 are similar to the channels of the upper cross bar 32 described above, but are generally drawn to a greater depth, thereby allowing the insertion of the actuator mounting ears therein, in addition to the handle ends. With reference to FIG. 12, sidewall 214 is terminated at a rearward, generally vertical free edge 222. In the preferred embodiment, the major, central body portion of the upper cross bar 202 lies in or immediately adjacent the plane containing the free edge 222 of the cross bar. Thus, substantially the entire portion of mounting ear 208 is enclosed within the channel 220. When mounting ear 208 of actuator 204 is received in the channel 220 at the left-hand end of the upper cross bar 202, the aperture 216 thereof is aligned with the central aperture 218 of the cross bar sidewall 214. A rivet fastener (not shown) or the like hinge pin is inserted through the aperture 218 and the aperture 219 in mounting ear 208. The fastener may also extend through an opposed portion 221 of the channel, adjacent the generally flat, planar portion of cross bar 202. The aperture 218 for the hinge pin fastener is spaced below the top edge of cross bar 202 to aid in retaining the handle end in the channel.

The increased depth of channel 220 accommodates the larger-sized mounting ears, such as those formed of molded materials. The increased depth allows the mounting ears received therein to have a thickness which is consistent with actuator members, made of molded plastic, for example, which exhibit a significant strength and durability.

As can be seen most clearly in FIG. 12, the mounting ear 208 has a protruding tip or free end with a rounded camming surface 224 for contacting the handle end 104, for clamping engagement therewith. As is apparent from FIG. 12, the camming surface is joined to the main body portion of actuator 204 by a lateral offset, herein extending generally perpendicular to the plane of the actuator. If desired, the camming surface 224 can have a concavity or groove formed therein to more closely conform to the outer surface of handle end 104, thereby increasing the area of contact therewith. Since the cam surface 224 and the free end of the leg 208 has substantial portions thereof received in the channel 220, the opposed, lateral sides of the leg 208 are guided throughout the range of motion of the actuator, particularly when the actuator is lowered into a clamping position, thus increasing the stability of the cam when a load is applied thereby, and relieving any stresses that might otherwise shorten the useful life of the actuator member.

With reference to FIG. 12, the preferred actuator construction offers a significant mechanical advantage when engaging and disengaging the handle lock 200. For example, the distance from the axis of rotation of the leg (centered about the mounting aperture 216) to the tip of camming surface 224 is substantially greater than the distance to the end wall 232, which is presented to the handle end when the actuator is raised in an upright position. As mentioned above, the cross bar channels can be made deep enough to receive the offset arm 208, thus providing a reinforcement therefor, should such be necessary to accommodate the locking forces associated with operation of the locking means 200.

In some applications, it may be desirable to reinforce or otherwise lock the actuator when placed in an elevated or generally horizontal position. If desired, a strut could be mounted to the underneath surface of the actuator, and could extend to the upper cross bar 202, so that heavier objects could be supported by the actuator, without the actuator collapsing to a stored position, such as that illustrated in FIGS. 10 and 12. Alternatively, the actuator 204 could be inverted so as to interchange its upper and lower surfaces, with reference to a tray-like actuator horizontally positioned, as illustrated in FIG. 11. With this modification, the offset surface 209 of the leg (see FIG. 12) will contact the handle end to prevent the tray-like actuator from collapsing under the weight of an object placed thereon. When the lock actuator is raised to a vertical position, the same locking force as that described above with reference to FIG. 12 is imparted to the handle ends. Thus, the modified actuator 204 somewhat resembles the orientation of the aforementioned actuator 176, illustrated in FIG. 8. In order to maintain the actuator in an upright, locked position a snap-action catch or the like can be installed at its upper free end, for mating with the upper edge of cross bar 202.

Thus, it can be seen that the handle locking means described above are selectively releasable so as to free the handle for movement to a different extension position, and to reengage the handle so as to maintain the new position thereof, despite loads applied to the handle as when pulled or pushed by a user of the cart. In the preferred embodiments described above, the handle locking means include actuators which are swingably mounted to the backing member for movement into and out of engagement with the handle. Clamping surfaces are carried on the lock actuators for clamping engagement with the handle.

No matter which of the locking means described above is used, the locking means can be constructed economically, using a minimum number of relatively inexpensive parts. As illustrated herein, the locking means can be made from a wire or rodlike member formed to have the camming surface, the rotatable mounting therefor, and a manually graspable lock actuator. Alternatively, the locking means can be incorporated in a tray-like actuator either stamped from metal or made of molded plastic. Further, the locking means described above may be stored in a position which does not interfere with operation of the cart, and which requires simple movements by a user to engage and disengage the locking means.

The drawings and the foregoing descriptions are not intended to represent the only forms of the invention in regard to the details of its construction and manner of operation. Changes in the form and in the proportion of parts, as well as the substitution of equivalents, are contemplated as circumstances may suggest or render expedient; and although specific terms have been employed they are intended in a generic and descriptive sense only and not for the purpose of limitation, the scope of the invention being delineated by the following claims.

What is claimed is:

1. A collapsible cart comprising:

first and second body members pivotally connected together at first ends;

wheel means for supporting the first ends of the first body member above a ground surface;

handle means mounted to said first body member for telescopic sliding therewith so as to extend varying amounts therefrom;

locking means carried on said first body member for selective clamping engagement with said handle means at a first extension position;

said locking means comprising a bail-shaped actuator with a pair of spaced coaxial outer ends comprising shafts rotatably mounted to said first body member whereby said actuator is swingable between first and second positions for releasing and engaging said handle means, respectively, said shafts located adjacent said handle means and including eccentric portions with camming surfaces for engaging said handle means when said actuator is rotated to the second position; and said locking means being selectively releasable so as to release said handle means for movement to a second extension position and to reengage said handle means with said handle means at said second position.

2. A collapsible cart comprising:

a backing member and a platform member, each having first and second opposed ends, said backing member including an outer frame and a stop member and said platform member including a generally planar outer frame;

pivotal connecting means for pivotally connecting said backing and platform members together at first ends so that said platform member contacts said stop member to limit the pivoting movement between the backing and platform members;

wheel means for supporting the first ends of the backing member above a ground surface;

handle means telescopically slidable so as to extend varying amounts from said backing member;

first and second cooperating locking means on said backing and platform members for releasably locking said platform member at a preselected angular displacement from said backing member to define an open, load-carrying position of said cart, and to maintain said backing and platform members at said preselected angular displacement;

said first locking means comprising a pair of spaced support bars carried within said backing member frame and connected to said stop member, each support bar including a protrusion adjacent said stop member so as to form a recess therewith;

said second locking means comprising a pair of spaced-apart support bars surrounded by said frame so as to cross said stop member when the cart is in said open, load-carrying position and said support bars carried by said frame for rotation therewith so as to be movable toward and away from said stop member, said support bars being resiliently deflectable toward and away from each other, in the plane of said frame, out of and into said recesses, respectively, said support bars aligned with said recesses when said platform member contacts said stop member, and said support bars trapped between said protrusions and said stop member when released for movement away from each other so as to lock said backing and platform members at a preselected angular position and said support bars being free to pivot with said backing member when deflected toward one another to allow pivoting of said backing and platform members toward one another to define a closed, storage configuration of said cart.

* * * * *

UNITED STATES PATENT AND TRADEMARK OFFICE
CERTIFICATE OF CORRECTION

PATENT NO. : 5,002,304

DATED : March 26, 1991

INVENTOR(S) : Richard M. Carrigan, Jr.

It is certified that error appears in the above-identified patent and that said Letters Patent is hereby corrected as shown below:

ON TITLE PAGE: of the patent, under the heading "References Cited", in the reference to Esposito, change the patent number from "4,286,969" to read --4,286,796--.

In Column 5, line 2, after "wire-like" delete the word --frame--.

Signed and Sealed this

Fourth Day of August, 1992

*Attest:*

DOUGLAS B. COMER

*Attesting Officer*     *Acting Commissioner of Patents and Trademarks*